United States Patent
Sedén

(10) Patent No.: US 10,974,314 B2
(45) Date of Patent: Apr. 13, 2021

(54) METHOD AND DEVICE FOR DETERMINING A TEMPERATURE DISTRIBUTION IN A MOLD PLATE FOR A METAL-MAKING PROCESS

(71) Applicant: ABB Schweiz AG, Baden (CH)

(72) Inventor: Martin Sedén, Västerås (SE)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 16/496,307

(22) PCT Filed: Mar. 12, 2018

(86) PCT No.: PCT/EP2018/056101
§ 371 (c)(1),
(2) Date: Sep. 20, 2019

(87) PCT Pub. No.: WO2018/172124
PCT Pub. Date: Sep. 27, 2018

(65) Prior Publication Data
US 2021/0039159 A1    Feb. 11, 2021

(30) Foreign Application Priority Data
Mar. 21, 2017  (EP) .................................... 17161984

(51) Int. Cl.
*B22D 2/00*  (2006.01)
*G01K 7/42*  (2006.01)
(Continued)

(52) U.S. Cl.
CPC .............. *B22D 2/00* (2013.01); *G01K 7/02* (2013.01); *G01K 7/427* (2013.01); *G01K 11/3206* (2013.01); *G01K 2213/00* (2013.01)

(58) Field of Classification Search
CPC . B22D 2/00; G01K 7/02; G01K 7/427; G01K 11/3206; G01K 2213/00
See application file for complete search history.

(56) References Cited

U.S. PATENT DOCUMENTS 6,142,662 A * 11/2000 Narh ..................... G01N 25/18
                                                     374/29
10,286,447 B2 * 5/2019 Kosugi ................ B22D 11/188
(Continued)

FOREIGN PATENT DOCUMENTS

CN  102834686 A  12/2012
CN  105880501 A   8/2016
(Continued)

OTHER PUBLICATIONS

European Search Report Application No. EP 17 16 1984 Completed:Sep. 18, 2017; dated Sep. 26, 2017 7 pages.
(Continued)

*Primary Examiner* — Nathaniel T Woodward
*Assistant Examiner* — Philip L Cotey
(74) *Attorney, Agent, or Firm* — Whitmyer IP Group LLC

(57) ABSTRACT

A method of determining a temperature distribution in a mold plate of a mold for a metal-making process, wherein the method includes: obtaining a temperature value from each of a plurality of temperature sensors arranged in the mold plate, each temperature sensor being spaced apart from a respective reference point in the mold plate, determining for each temperature value a reference point temperature value at the corresponding reference point using either a respective linear function or a respective non-linear function, wherein a correction factor and correction term of the linear function or a set of parameters in a general non-linear formulation of the non-linear function is obtained from a plurality of initial temperature relationships, wherein each initial temperature relationship is between a simulated temperature at the corresponding temperature sensor in the mold plate and a simulated temperature at the corresponding reference point in the mold plate, each simulated temperature being obtained based on a respective simulation of a (Continued)

model of the mold plate for a unique mold plate condition where the thermal boundary conditions of the mold plate have been completely, explicitly and uniquely stated, and obtaining an estimated temperature distribution at the reference points in the mold plate by means of the reference point temperature values.

17 Claims, 2 Drawing Sheets

(51) Int. Cl.
*G01K 11/3206* (2021.01)
*G01K 7/02* (2021.01)

(56) References Cited

U.S. PATENT DOCUMENTS

| | | | |
|---|---|---|---|
| 10,632,526 B2* | 4/2020 | Honda | G01L 1/246 |
| 2006/0182832 A1 | 8/2006 | Ho | |
| 2008/0169074 A1* | 7/2008 | Sakurai | B22D 46/00 164/4.1 |
| 2011/0144790 A1 | 6/2011 | Gerritsen et al. | |
| 2011/0186262 A1 | 8/2011 | Schulze et al. | |
| 2011/0264425 A1* | 10/2011 | Yaokawa | B22D 17/32 703/2 |
| 2012/0048011 A1* | 3/2012 | Dussud | B22D 11/205 73/304 R |
| 2012/0048497 A1* | 3/2012 | Fugarolas | C22B 9/14 164/47 |
| 2015/0298204 A1* | 10/2015 | Nakaoka | B22D 27/02 164/452 |
| 2015/0343530 A1* | 12/2015 | Duncan | B22D 46/00 164/154.6 |
| 2018/0050387 A1* | 2/2018 | Honda | B22D 2/006 |
| 2019/0193146 A1* | 6/2019 | Kosugi | B22D 11/041 |

FOREIGN PATENT DOCUMENTS

| | | |
|---|---|---|
| CN | 106413942 A | 2/2017 |
| EP | 3100802 A1 | 12/2016 |
| WO | 2012168005 A1 | 12/2012 |
| WO | 2016163536 A1 | 10/2016 |
| WO | 2017032392 A1 | 3/2017 |

OTHER PUBLICATIONS

International Preliminary Report on Patentability Application No. PCT/EP2018/056101 Completed: Jun. 7, 2019; dated Jun. 7, 2019 12 pages.
International Search Report and Written Opinion of the International Searching Authority Application No. PCT/EP2018/056101 Completed: Jun. 22, 2018; dated Jul. 3, 2018 12 pages.
Chinese Office Action Application No. 201880019937 Completed: Apr. 20, 2020 8 pages.

* cited by examiner

METHOD AND DEVICE FOR DETERMINING A TEMPERATURE DISTRIBUTION IN A MOLD PLATE FOR A METAL-MAKING PROCESS

TECHNICAL FIELD

The present disclosure generally relates to metal-making and in particular to a method and device for determining a temperature distribution in a mold plate of a mold for a metal-making process.

BACKGROUND

In metal-making such as continuous casting a mold is used for shaping and for cooling the molten metal to thereby obtain a metal product which has a solidified shell. The solidified shell of a cast slab is obtained by mold cooling at the top of the and grows thicker further down the strand as more heat is extracted from the strand. Due to various reasons, the solidified shell may be locally thinner at some places, thus risking breakage of the shell. An event in which the liquid steel in the strand spills out due to this local thinning is called a breakout and causes major damage and stop time to the caster. By monitoring the temperatures and heat fluxes of the strand, breakouts can be predicted quickly, thus allowing countermeasures to be applied before the event has become severe.

Other quality issues during casting in the mold are stickers, cracks, inhomogeneous solidification and insufficient taper contact. A sticker is when the lubricating mold flux layer between the steel strand and the mold opens up a gap and the solidified steel shell makes contact and sticks to the mold copper plate. This may rupture the shell causing degraded quality or process handling problems. A surface crack also leads to downgrade of the final slab. An inhomogeneous solidification around the perimeter of the mold leads to inhomogeneous internal material properties of the cast product. Taper is the slant angle of the narrow face mold plates in a slab caster that optimally should be in constant contact with the strand for maximum strand cooling. At insufficient taper, the strand is not cooled at the bottom of the narrow sides of the mold.

The temperature distribution in the molten steel is also of interest to find deviations of the molten metal flow pattern from normal or desired conditions.

All these phenomena can be observed by sensing the temperature distribution in the mold copper plates with high resolution. Ideally, the temperature of the slab would be measured, but the mold plates, being constructed of thermally conducting copper, make it possible to measure the temperature of the copper plates and deduce the thermal events in the steel shell and melt indirectly.

The temperature in continuous casting slab molds is conventionally measured at an array of locations in order to monitor the stability of solidification around the entire slab surface. A common breakout protection/sticker detection system consists of up to 60-100 thermocouples around the upper half of the mold. The thermocouples are either pushed from the back-up plate onto the mold copper plate surface by springs, or placed in drilled holes in the copper plate.

Conventional thermocouple technology is a widely spread solution for thermal monitoring in a casting mold, where a few thermocouples are coarsely arranged in the mold plate. The thermocouple sensors are typically located a distance below the molten metal level at positions where mechanical bolts are present to mount a back-up plate onto the mold plate to mechanically strengthen the mold. To make room for the bolts, the water cooling channels commonly located at the back end of the mold plate have been separated by an extra distance, usually placing the bolts and the thermocouples in the middle symmetrically between the cooling channels, with an equal distance from the thermocouple sensor to both adjacent cooling channels. Thus, the heat transfer from the hot mold surface to the cooling channels at the back end of the mold plate is, at the position of a thermocouple, directed perpendicular to the hot mold surface and can be accurately described by a one-dimensional heat transfer model. The temperature distribution across the mold plate thickness at the position of the thermocouple may hence be solved by a one-dimensional method as is described in EP 3 100 802 A1.

Fiber optical temperature sensors, for example, Fiber Bragg grating (FBG) temperature sensors may provide an order of magnitude higher sensor density, and thus a higher thermal measurement resolution. US201186262 discloses the use of FBG temperature sensors in a casting mold.

SUMMARY

The thermal transport from the hot face of the plate to the location of the temperature sensors is not trivial for molds with more complex geometries or topologies. It has been found by the present inventors that the application of a dense array of temperature sensors, implemented for example by means of fiber optical sensors, needs to be complemented with information about the mold geometry and cooling arrangement to be able to accurately monitor the hot face temperatures by analyzing data from the temperature sensors located deeper in the mold copper plates.

In view of the above, an object of the present disclosure is to provide a method of determining a temperature distribution in a mold plate which solves, or at least mitigates, the problems of the prior art.

There is hence according to a first aspect of the present disclosure provided a method of determining a temperature distribution in a mold plate of a mold for a metal-making process, wherein the method comprises: obtaining a temperature value from each of a plurality of temperature sensors arranged in the mold plate, each temperature sensor being spaced apart from a respective reference point in the mold plate, determining for each temperature value a reference point temperature value at the corresponding reference point using either a respective linear function or a respective non-linear function, wherein a correction factor and correction term of the linear function or a set of parameters in a general non-linear formulation of the non-linear function is obtained from a plurality of initial temperature relationships, wherein each initial temperature relationship is between a simulated temperature at the corresponding temperature sensor in the mold plate and a simulated temperature at the corresponding reference point in the mold plate, each simulated temperature being obtained based on a respective simulation of a model of the mold plate for a unique mold plate thermal condition as given by a complete and explicit specification of the thermal boundary conditions at all outer surfaces of the mold plate, and obtaining an estimated temperature distribution at the reference points in the mold plate by means of the reference point temperature values.

An effect which may be obtained thereby is online calculation of an accurate thermal distribution in the mold plate, obtained from of a dense grid of temperature sensors, applicable for all types of casting molds with all types of cooling methodologies.

The estimated temperature distribution gives a much more representative thermal picture of what temperature the hot face of the mold plate is exposed to, and indirectly information about the state of the cast metal in the caster strand, independent of the mold type. Therefore, more appropriate actions can be taken for different types of shell defects and melt flow irregularities, and as a result a much safer and cheaper metal making process can be achieved. Also, better product quality may be obtained when using the thermal distribution information in conjunction with a flow modifying device to arrive at the optimal fluid flow patterns etc.

According to one embodiment, the correction factor and the correction term of the linear function is unique for the temperature sensor in question.

According to one embodiment, the correction factor is a first constant which is multiplied with the corresponding temperature value to obtain a product and the correction term is a second constant added to the product.

According to a further embodiment, the set of parameters in the general non-linear formulation is unique for the temperature sensor in question.

According to a further embodiment, the general non-linear formulation of the non-linear function is a non-linear function polynomial expansion and the set of correction coefficients of the non-linear function polynomial expansion is unique for the temperature sensor in question.

According to one embodiment each reference point is a point of the hot face of the mold plate.

According to one embodiment each temperature sensor is a fiber optical sensor that may be any type of the types: Fiber Bragg grating (FBG) sensor, interferometric fiber sensor, optical fiber polarimetric sensor, fiber optic micro bend sensor, distributed fiber optic sensor in either the time or frequency domain based on Raman, Brillouin or Rayleigh scattering. By using fiber optical sensors, very detailed information about the thermal distribution inside the mold may be provided.

There is according to a second aspect of the present disclosure provided a computer program comprising computer-executable code which when executed by a temperature calculating device performs the method according to the first aspect disclosed herein.

There is according to a third aspect of the present disclosure provided a computer program product comprising a storage medium provided with the computer program of the second aspect.

There is according to a fourth aspect of the present disclosure provided a temperature calculating device for performing the method steps defined in the claims.

There is according to a fifth aspect of the present disclosure provided a system for determining a temperature distribution in a mold plate of a mold for a metal-making process, wherein the system comprises: a temperature calculating device according to the fourth aspect, and a plurality of fiber optical sensors configured to be arranged in the mold plate and configured to provide temperature values concerning the temperature in the mold plate to the temperature calculating device.

Generally, all terms used in the claims are to be interpreted according to their ordinary meaning in the technical field, unless explicitly defined otherwise herein. All references to a/an/the element, apparatus, component, means, etc., are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which:

FIG. 2b shows a section in an x-y plane of the broad face of the mold plate in FIG. 2a.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
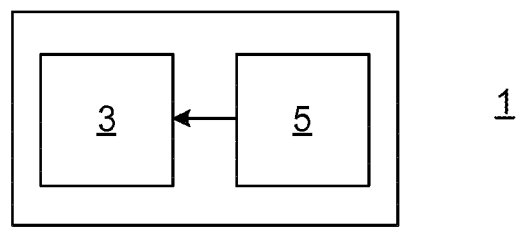
FIG. 1 schematically shows an example of a temperature calculating device for determining a temperature distribution in a mold plate.

FIG. 1 shows an example of a temperature calculating device 1 for determining a temperature distribution in a mold plate of a mold for a metal-making process. Such a metal-making process is typically a continuous casting process, for example for steelmaking, aluminum, copper or lead-making.

The temperature calculating device 1 comprises processing circuitry 3 and a storage medium 5. The storage medium 5 comprises computer code which when executed by the processing circuitry 3 causes the temperature calculating device 1 to perform the methods disclosed herein.

The processing circuitry 3 uses any combination of one or more of a suitable central processing unit (CPU), multiprocessor, microcontroller, programmable logic controller (PLC), digital signal processor (DSP), application specific integrated circuit (ASIC), field programmable gate arrays (FPGA) etc., capable of executing any herein disclosed operations concerning temperature distribution calculations.

The storage medium 5 may for example be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

Figure 2A:
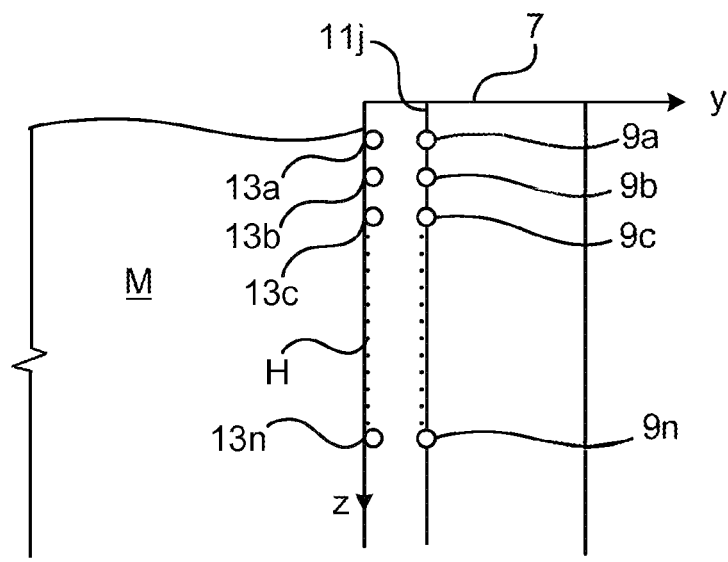
FIG. 2a depicts a section in a y-z plane of a broad face of mold plate.

FIG. 2a shows a section through a mold plate 7 having a hot face H configured to face molten metal M. It may be noted that during regular casting conditions, the mold plate and the molten metal are typically separated by a thin layer of lubricating mold flux. The mold plate 7 is configured to be cooled by a coolant. To this end, the mold plate comprises a plurality of cooling slots in which the coolant is able to flow to cool the mold plate 7 and thus the molten metal M. The coolant is typically water, and the cooling slots are in this case water cooling slots. For reasons of clarity, the cooling slots have been omitted in FIG. 2a.

The mold plate 7 comprises a plurality of temperature sensors 9a-9n, at least part of which may not have a placement in the mold plate where the heat transfer direction is linearly aligned with the normal direction to the mold plate hot surface. At least part of the temperature sensors $9a$-$9n$ may not have a symmetric placement in respective of adjacent cooling channels, or at least part of the temperature sensors must be positioned above the molten metal level or close to adjacent mold plates, or at least part of the temperature sensors are located in regions of mold plate topological complexities such as curvature, chamfered edges or corners.

Each temperature sensor $9a$-$9n$ is configured to detect a temperature in the mold plate 7 at the location where it is installed in the mold plate 7. In this manner a plurality of temperature values in the mold plate 7 may be obtained from the temperature sensors $9a$-$9n$.

Figure 2B:
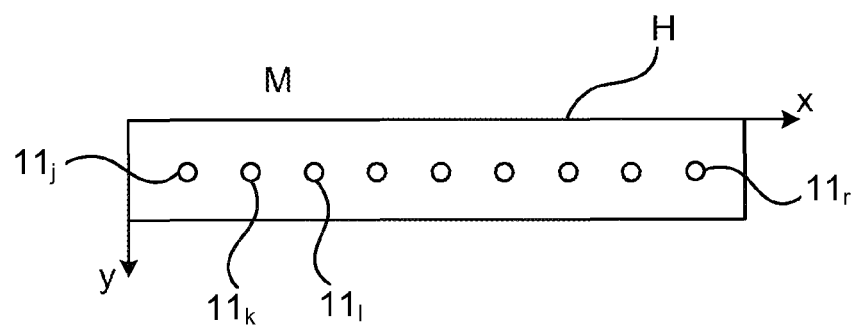
Figure 3:
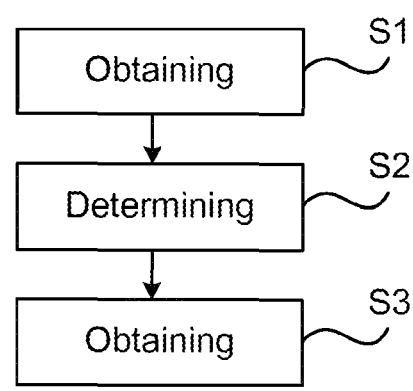
FIG. 3 is a flowchart of a method of determining a temperature distribution in a mold plate.

Each temperature sensor $9a$-$9n$ is associated with coordinates in a coordinate system defined by the three axes x, y, and z shown in FIGS. 2a and 2b, z typically being the vertical axis. The location of each temperature sensor $9a$-$9n$ in the coordinate system is defined by its coordinates. The coordinates of a temperature sensor $9k$ has coordinates in the form ($x_{9k}$, $y_{9k}$, $z_{9k}$). The temperature value measured by a temperature sensor $9a$-$9n$ is the temperature at the location of the temperature sensor $9a$-$9n$ in question.

Each temperature sensor $9a$-$9n$ is associated with a respective reference point $13a$-$13n$ located in the coordinate system in the mold plate 7. For example, temperature sensor $9a$ is associated with the reference point $13a$ and temperature sensor $9b$ is associated with the reference point $13b$. The reference points $13a$-$13n$ may be any points located in the mold plate 7, spaced apart from the temperature sensors $9a$-$9n$. The reference points $13a$-$13n$ are typically located close to or on the hot face H of the mold plate 7 in order to be able to obtain a temperature estimation at the hot face H.

According to the present example, each temperature sensor $9a$-$9n$ is a fiber optical sensor but they could alternatively be for example thermocouples. The mold plate 7 comprises a plurality of optical fibers $11j$-$11r$ extending from one end of the mold plate 7 to an opposite end thereof. Each optical fiber $11j$-$11r$ comprises a plurality of temperature sensors $9a$-$9n$, e.g. FBGs, distributed along the longitudinal direction of the optical fiber $11j$-$11r$. In this manner a dense grid, or matrix, of temperature sensors $9a$-$9n$ may be obtained in the x-z plane. In the section depicted in FIG. 2a, only one such optical fiber $11j$ is shown, while FIG. 2b shows a plurality of optical fibers $11j$-$11r$ distributed along the x-axis of the mold plate 7, extending longitudinally along the z-axis.

The present method enables the estimation of the temperature at the reference points $13a$-$13n$ based on the temperature values obtained from the temperature sensors $9a$-$9n$ as will be explained in the following.

In a step S1 the temperature calculating device 1 obtains temperature values from each of the plurality of sensors $9a$-$9n$ arranged in the mold plate 7, typically from a plurality of the optical fibers $11j$-$11r$ distributed in the mold plate 7 along the x-axis.

In a step S2, a reference point temperature value is determined for each temperature value obtained from the temperature sensors $9a$-$9n$ in step S1. This reference point temperature value for each temperature value is determined by means of either a respective linear function or a respective non-linear function. Either the linear function or the non-linear function describes a temperature relationship between the corresponding temperature value and an estimated temperature at the corresponding reference point. As an example, when a temperature value $T_{9a}$ is obtained from the temperature sensor $9a$, the corresponding function transforms the temperature value $T_{9a}$ to a reference point temperature value $T_{13a}$, which is the estimated temperature at the reference point $13a$. The estimated temperature may be obtained by simulation.

The linear function may be expressed as shown in equation (1) below.

$$f_{9i}(T_{9i})=c_{9i} \cdot T_{9i}+d_{9i}=T_{13i} \quad (1)$$

where i is a number between 1 and n*r, $c_{9i}$ is a correction factor and $d_{9i}$ is a correction term for temperature sensor $9i$. Each linear function $f_{9i}$ includes the correction factor $c_{9i}$ which is a constant and the correction term $d_{9i}$ which also is a constant. The function $f_{9i}$ is unique for each pair of associated temperature sensor and reference point $9i$ and $13i$.

Alternatively, a general non-linear function formulation may be used to describe a temperature relationship between the temperature value obtained from a temperature sensor and an estimated temperature at the corresponding reference point. This general formulation may be expressed as in equation (2) below, $$f_{9i}(T_{9i})=T_{13i}=g(d_i,T_{9i},M) \quad (2)$$

where g is a general non-linear function of the temperature $T_{9i}$ at sensor point $9i$, and $d_1$ is a set of M constant parameters $d_1, d_2, \ldots, d_l, \ldots, d_M$, where M is an integer which is at least 1, and l ranges from 1, 2, ... to M. The function $f_{9i}$ is unique for each pair of associated temperature sensor and reference point $9i$ and $13i$.

As an example, such a non-linear function may be formulated as a polynomial Taylor expansion as in equation (3) below, $$f_{9i}(T_{9i})=T_{13i}=\Sigma_{k=0}^{N}c_{9i,k}T_{9i}^{k}=c_{9i,0}+c_{9i,1} \cdot T_{9i}+c_{9i,2} \cdot T_{9i}^{2}+ \ldots +c_{9i,2} \cdot T_{9i}^{N} \quad (3)$$

where $c_{9i,k}$ is a set of correction coefficients for sensor point $9i$, where k is the order of the non-linear expansion term and the expansion sums over a range of polynomial orders from 0, 1, 2, ... to N, where N is the maximum order of the non-linear expansion. The function $f_{9i}$ is unique for each pair of associated temperature sensor and reference point $9i$ and $13i$.

Thus, in step S2, when a linear function as expressed in equation (1) is used, each reference point temperature value is determined using the corresponding function $f_{9i}$ by multiplying the correction factor with the corresponding temperature value to obtain a product and add the correction term. The correction factor and correction term for each reference point is extracted by the processing circuitry 3 from the storage medium 5; while when a general non-linear function expressed in equation (2) is used, each reference point temperature value is determined by using a set of parameters $d_1$. The constant parameters are extracted by the processing circuitry 3 from the storage medium 5. When the general non-linear function being presented as a non-linear polynomial function expressed in equation (3) is used, each reference point temperature value is determined by using a set of higher-order correction coefficients $c_{9i,k}$. The correction coefficients are extracted by the processing circuitry 3 from the storage medium 5. In this manner the reference point temperature values, which are estimations of the temperature at the reference points, are obtained.

In a step S3, an estimated temperature distribution at the reference points $13a$-$13n$ is obtained by means of the reference point temperature values $T_{13i}$. The temperature distribution provides for each reference point a reference point temperature value. This temperature distribution may as an example be presented visually on a display or used for further data analysis.

By means of the presented method, an online three-dimensional temperature distribution in the mold plate 7 may be obtained. In particular, if the reference points 13a-13n are selected to be at the hot face H, an estimation of the temperature distribution at the hot face may be obtained. In case the density of the grid formed by the temperature sensors 9a-9n in the plurality of optical fibers 11j-11r, is selected to be high enough, a high-resolution temperature distribution in the mold plate 7 can be obtained.

Taking the linear function of equation (1) as an example, the functions $f_{9i}$ which transform the temperature values measured by the temperature sensors 9a-9n can be determined as follows.

The thermal asymmetry and the non-perpendicular heat flux directions in the mold plate 7 can be determined based on a model of the mold plate 7. Determination of the thermal asymmetry and the non-perpendicular heat flux may in particular involve solving partial differential equations for heat transfer in solid media with boundary conditions of the cooling slots and an ideal homogeneous heat profile of the hot face of the mold plate. An estimated heat distribution in the mold plate 7 may in this manner be obtained in three dimensions for a certain mold plate condition. An initial temperature relationship between a simulated temperature at each temperature sensor and the corresponding reference points may in this manner be obtained for the mold plate condition in question. For example, if a simulation of the model, using a specific mold plate condition of a homogeneously distributed temperature over the hot face of the mold plate, a cooling water temperature and heat transfer coefficient as boundary condition for the mold-water interfaces, and heat transfer coefficients between the mold and the ambient materials for the rest of the mold surfaces, results in a simulated temperature of $T_{9i}=250°$ C. at the location of a temperature sensor and a simulated temperature of $T_{13i}=500°$ C. for the corresponding reference point, there will be two unknown constants in equation (1) associated with each temperature sensor 9a-9n, with $T_{9i}$ and $T_{13i}$ being known. These unknown constants are the corresponding correction factor $c_{9i}$ and correction term $d_{9i}$. By using at least two different unique mold plate thermal conditions, and simulating for each case, a respective equation system associated with each temperature sensor 9a-9n can be obtained, each containing at least two initial temperature relationships. Solving each such equation system, the correction factor $c_{9i}$ and the correction term $d_{9i}$ associated with the temperature sensors 9a-9n may be obtained, which reflect the three-dimensional temperature distribution, non-perpendicular heat transfer and/or the thermal asymmetry of the mold plate 7, and the temperature relationships in equation (1) are hence obtained with each $c_{9i}$ and $d_{9i}$ being known. In this manner, the reference point temperature values may be determined in step S2 as previously explained. Thus, the present invention may not be limited to one-dimensional heat transfer perpendicular to the mold plate hot surface. This non-perpendicular heat transfer at the sensing points may be caused by the asymmetrical placement of the fiber optical sensors, a non-flat mold plate within a particular area of the plate, a non-homogeneous cooling channel arrangement at the back end of the mold plate, placement of the temperature sensors above the molten metal level or close to adjacent mold plates or corners, which thus results in a non-perpendicular heat transfer direction.

A similar principle is applicable to the case of a polynomial or general non-linear function.

The temperature calculating device 1 may be utilized in a system which comprises the temperature calculating device 1 and a plurality of temperature sensors 9a-9n, in particular a plurality of fiber optical sensors configured to be arranged in a mold plate, the fiber optical sensors may be for example any of the types Fiber Bragg grating (FBG) sensors, interferometric fiber sensors, optical fiber polarimetric sensors, fiber optic micro bend sensors, distributed fiber optic sensors in either the time or frequency domain based on Raman, Brillouin or Rayleigh scattering.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of determining a temperature distribution in a mold plate of a mold for a metal-making process, wherein the method includes:

obtaining a temperature value from each of a plurality of temperature sensors arranged in the mold plate, each temperature sensor being a sensing point and being spaced apart from a respective reference point in the mold plate, for each of the sensing points, obtaining, from a plurality of initial temperature relationships, the correction factor and correction term of a linear function or a set of parameters in a general non-linear formulation of a non-linear function, wherein each initial temperature relationship is between a simulated temperature at the corresponding temperature sensor in the mold plate and a simulated temperature at a corresponding reference point in the mold plate, each simulated temperature being obtained based on a respective simulation of a model of the mold plate for a unique thermal mold plate condition wherein the thermal boundary conditions of the mold plate have been completely, explicitly and uniquely stated, determining for each temperature value the reference point temperature value at the corresponding reference point using either the respective linear function or the respective non-linear function, and obtaining an estimated temperature distribution at the reference points in the mold plate by means of the reference point temperature values.

2. The method as claimed in claim 1, wherein the correction factor and the correction term of the linear function is unique for the temperature sensor in question.

3. The method as claimed in claim 2, wherein the correction factor is a first constant which is multiplied with the corresponding temperature value to obtain a product and the correction term is a second constant added to the product.

4. The method as claimed in claim 2, wherein each reference point is a point on the hot face of the mold plate.

5. The method as claimed in claim 2, wherein each temperature sensor is a fiber optical sensor.

6. The method as claimed in claim 2, wherein the unique thermal mold plate condition is of homogeneously distributed temperature over the hot face of the mold plate, a cooling water temperature and heat transfer coefficient as boundary condition for the mold-water interfaces, and heat transfer coefficients between the mold and the ambient materials for the rest of the mold surfaces.

7. The method as claimed in claim 1, wherein the set of parameters of the general non-linear function is unique for the temperature sensor in question.

8. The method as claimed in claim 1, wherein the general non-linear formulation of the non-linear function is a non-linear function polynomial expansion and the set of correction coefficients of the non-linear function polynomial expansion is unique for the temperature sensor in question.

9. The method as claimed in claim 1, wherein each reference point is a point on the hot face of the mold plate.

10. The method as claimed in claim 1, wherein each temperature sensor is a fiber optical sensor.

11. The method as claimed in claim 10, wherein the fiber optical sensor is any kind of Fiber Bragg grating (FBG) sensor, interferometric fiber sensor, optical fiber polarimetric sensor, fiber optic micro bend sensor, distributed fiber optic sensor in either the time or frequency domain based on Raman, Brillouin or Rayleigh scattering.

12. The method as claimed in claim 1, wherein the unique thermal mold plate condition is of homogeneously distributed temperature over the hot face of the mold plate, a cooling water temperature and heat transfer coefficient as boundary condition for the mold-water interfaces, and heat transfer coefficients between the mold and the ambient materials for the rest of the mold surfaces.

13. A computer program comprising computer-executable code which when executed by a temperature calculating device performs the method as claimed in claim 1.

14. A computer program product comprising a storage medium provided with the computer program of claim 13.

15. A temperature calculating device for determining a temperature distribution in a mold plate of a mold for a metal-making process, wherein the temperature calculating device includes:
processing circuitry, and
a storage medium including computer-executable code which when executed by the processing circuitry causes the temperature calculating device to perform method steps of claim 1.

16. A system for determining a temperature distribution in a mold plate of a mold for a metal-making process, wherein the system includes:
a temperature calculating device as claimed in claim 15, and
a plurality of fiber optical sensors configured to be arranged in the mold plate and configured to provide temperature values concerning the temperature in the mold plate to the temperature calculating device.

17. The system as claimed in claim 16, wherein the fiber optical sensor is any kind of Fiber Bragg grating (FBG) sensor, interferometric fiber sensor, optical fiber polarimetric sensor, fiber optic micro bend sensor, distributed fiber optic sensor in either the time or frequency domain based on Raman, Brillouin or Rayleigh scattering.

* * * * *